United States Patent [19]

Tabor

[11] 3,712,407

[45] Jan. 23, 1973

[54] SEISMIC PULSE GENERATING APPARATUS

[76] Inventor: Charles A. Tabor, 604 South Avenue D., Kermit, Tex. 79745

[22] Filed: July 17, 1970

[21] Appl. No.: 55,935

[52] U.S. Cl. .........181/.5 EM, 181/.5 EC, 181/.5 NC
[51] Int. Cl. ..............................................G01v 1/06
[58] Field of Search .........181/.5 AG, .5 EC, .5 XC, 181/.5 VM, .5 NC, .5 EM

[56] References Cited

UNITED STATES PATENTS

| 3,613,824 | 10/1971 | Loper | 181/.5 EM |
| 3,506,085 | 4/1970 | Loper | 181/.5 H |
| 3,403,748 | 10/1968 | Tabor | 181/.51 C |
| 3,429,396 | 2/1969 | Jenner et al. | 181/.51 C |
| 3,374,853 | 3/1968 | Kilmer | 181/.51 C |
| 3,480,102 | 11/1969 | Kilmer | 181/.5 NC |
| 3,282,327 | 11/1966 | Brown et al. | 181/.5 EM |

Primary Examiner—Benjamin A. Borchelt
Assistant Examiner—N. Moskowitz
Attorney—Cushman, Darby & Cushman

[57] ABSTRACT

A seismic pulse generating apparatus having a combustion chamber formed by a piston and cylinder with energizable electromagnets which hold the piston and cylinder together to allow the compression chamber to be filled with a combustible gas mixture to a desired pressure prior to ignition and the generation of the seismic pulse.

1 Claim, 1 Drawing Figure

PATENTED JAN 23 1973
3,712,407
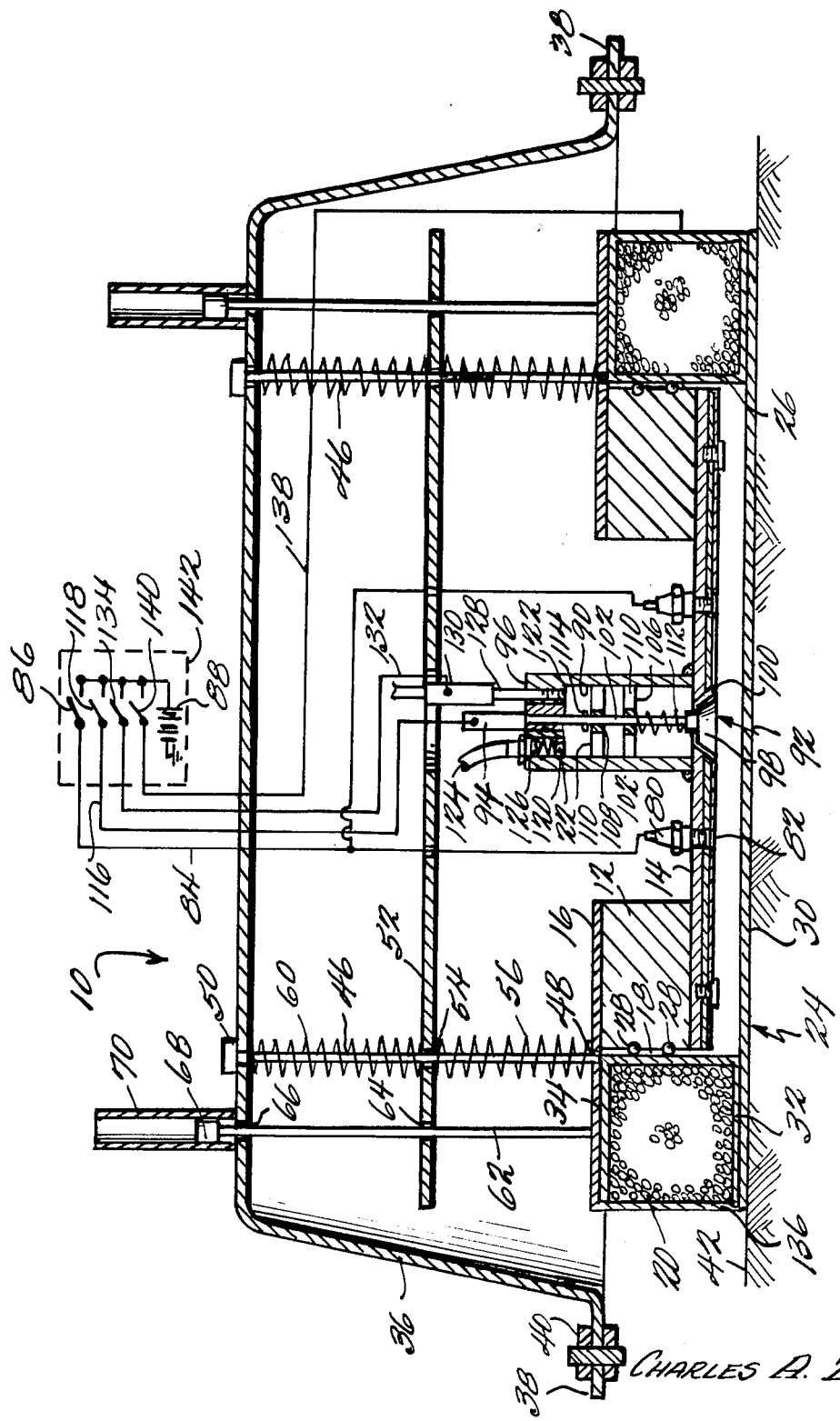
INVENTOR
CHARLES A. TABOR
BY
Cushman, Darby & Cushman
ATTORNEYS

SEISMIC PULSE GENERATING APPARATUS

BACKGROUND OF THE INVENTION

The present invention relates generally to an apparatus for generating seismic pulses. The invention is specifically concerned with an improved apparatus for generating seismic impulses without the necessity of drilling seismic shot holes.

The use of seismic impulses for the study of the earth's substrata is well known in the art and generally comprises the generation of a seismic disturbance at or near the earth's outer surface by suitable means. A portion of the seismic impulse or disturbance travels downwardly through the inner earth surface until it encounters a subsurface discontinuity, such as in interface between strata, which will cause a reflection of a portion of the seismic energy back towards the outer surface of the earth. Sensitive detection devices, such as geophones, placed in the vicinity of the generated seismic disturbance detect the reflected seismic wave energy. By measuring the time intervals between the initiation of the seismic impulses and the reception of the reflected energies at each of many detection stations, it is possible to determine the nature and structure of the underlying earth subsurface. The use of seismic impulses has found particular utility in prospecting for petroleum.

Of the various seismic techniques employed in the search for earth structures favorable for the accumulation of oil and gas deposits, probably the most well known is the so-called shot hole method wherein a shot hole is drilled into the ground and a suitable explosive charge, such as dynamite, is detonated within the shot hole to generate the desired seismic impulses. While the shot hole method has enjoyed considerable success, various other seismic exploration system such as the so-called "weight drop method" and the "explosion method" have been developed which eliminate the costly necessity of drilling shot holes.

In the "weight drop method" a heavy weight is lifted above the earth's surface and dropped in order to generate the desired seismic impulse. According to the "explosion method," to which the present invention most closely relates, the seismic shock is generated by the explosion of a suitable explosive charge, such as a mixture of propane and oxygen within a pan-like member which rests upon the ground surface with its upper portion being enclosed and sealed, by means of a suitable gasket, within a heavy weight member, typically weighing in the neighborhood of eight tons. Among the drawbacks of such apparatus is the susceptibility of the relatively expensive pan member to damage from the explosion. In addition, the gasket employed to effect a seal between the periphery of the pan and the superposed weight member, which typically comprises a large neoprene rubber O-ring, can, and often does, permit the escape of the exploding mixture and consequent damage to the equipment and its surroundings. A further and more significant disadvantage of such prior "explosion method" apparatus is the limited magnitude of the seismic impulse which can be generated thereby because such apparatus are capable of developing only a relatively limited compression of the explosive fuel mixture prior to its ignition.

A precursor of the apparatus of the invention is disclosed in my U.S. Pat. No. 3,403,748 which issued on Oct. 1, 1968.

SUMMARY OF THE INVENTION

The explosion chamber is situated between the piston and the ground. A housing which is preferably cylindrical surrounds the piston member and the piston is provided with a shoulder portion which fits over the top of the housing. Plate means, which has a heavy weight mounted thereon, is disposed on the housing over piston member and is separated from its by heavy compression springs. The springs alone can help to hold the piston in place against the housing member so that gas under pressure can be introduced and the pressure permitted to build to a certain level before the spring permits the piston to move upward. The correct pressure level is ascertained at that level at which the piston has not yet moved upward, forcing the spring back against the plate, but is about to do so.

The electromagnet means which surround the piston can be used to hold the piston in place rather than move it downward to reduce the volume of the compression chamber after the gas has been added thereto. By this arrangement smaller power sources can be employed to effect any given compression of the explosive mixture. Thus, the cylinder chamber is prevented from expanding until pressure in the chamber has reached a predetermined level.

The strength of the shock wave created from the exploding gas is proportional to the pressure. To increase the strength of the shock wave, one must maximize the pressure in the combustion chamber for a given volume of gas; then the recoil from the explosion must be controlled, especially in a unit that can be mounted on a vehicle to be mobile.

The device of the invention is preferably mounted on a vehicle, e.g. an earth moving machine in place of the shovel. This allows approximately 9 tons of weight to be applied on the arms of the seismic wave generator when it is set in place for firing, by applying a part of the weight of the carrying vehicle upon the arm attachment using hydraulic rams. Including the weight of the piston and the plates used for mounting, there can be approximately 12 to 14 tons to fire against to control the recoil.

The preferred embodiment includes two sets of shock absorbing springs separated by a heavy plate. The spring arrangement and number as well as the depth of the piston housing and piston are determined by distance of travel needed to control the recoil of a desired shock wave. If a very strong shock wave is desired, the housing and piston depth may be made greater and by applying the electromagnetic feature, there can be obtained the pressure to create it. If a weak shock wave is desired, the user can fire against the weight of the vehicle and apparatus only.

Another control feature preferably included is check valves mounted on the piston plate flange or piston itself to retard the spring reaction after firing to keep the piston from hammering down on the housing. Another aid in this results from the automatic introduction of compressed air into the combustion chamber immediately after firing to scavenge the burned gases and cushion the piston return. Allowing the piston flange to rest in contact with the housing, thus eliminating the air gap, permits greater pressure to be obtained in the combustion chamber with the same amount of electrical current operating the electromagnetic feature.

The physical dimension of the piston of the preferred embodiment is approximately 50 inches in diameter. However, a plurality of pistons may be mounted on a common plate, have housings which are common and all be fixed simultaneously.

The principles of the invention will be further hereinafter discussed with reference to the drawing wherein a preferred embodiment is shown. The specifics illustrated in the drawing are intended to exemplify, rather than limit, aspects of the invention as defined in the claims.

BRIEF DESCRIPTION OF THE DRAWING

In the Drawing

The FIGURE is a longitudinal vertical sectional view, similar to FIG. 1 of my U.S. Pat. No. 3,403,748, but illustrating the device of the present invention.

DETAILED DESCRIPTION OF THE PRESENTLY PREFERRED EMBODIMENT

The device 10 includes an annular piston 12 completed by a disk-shaped plate 14 secured to its lower end and by an annular plate 16 secured to its upper end. The plate 16 extends radially outwardly beyond the outer extent of the peripheral sidewall 18 of the piston 12 to provide a downwardly facing shoulder 20. The plate 14, centrally of the annular piston, mounts manifold means 22 identical to that described in my aforementioned U.S. patent. The device 10 further includes a tubular cylinder 24 having an inner peripheral surface 26. PIston rings 28 mounted in circumferential recesses in the piston sidewall 18 engage the peripheral surface 26. The cylinder 24 is completed by a disk-shaped plate 30 secured to the lower end of the cylinder sidewall member 24.

A torus of windings of an electromagnet 32 are carried on the plate 30 exteriorly adjacent the cylinder sidewall member 24. The upper end of the electromagnet 32 provides an upwardly facing shoulder 34 which normally supports the piston via the downwardly facing shoulder 20 of the plate 16.

An inverted, cup-shaped housing 36 is positioned over the piston and cylinder arrangement and includes opposed arms 38 with securement means 40 by which the device 10 may be mounted on a vehicle, for instance on a large earth mover in place of its shovel. In such instance, the hydraulic rams normally used for raising the shovel can be used to force the device against the ground 42 with most of the weight of the vehicle, e.g., with about 9 tons force.

A plurality of angularly spaced vertical rods 46 are secured to the upper end of the cylinder sidewall member 24, freely extend up through openings 48 in the plate 16 and have their upper ends secured to the housing 36 at 50.

A heavy, horizontal disk-shaped plate 52 is provided within the housing vertically intermediate the piston and the housing. The plate 52 includes a plurality of holes 54 through which the rods 46 pass. The rods 46 between the piston shoulder plate 16 and the plate 52 each receive a coil spring 56 engaging both plates. The rods 46 between the plate 52 and the top wall 58 of the housing each receive a coil spring 60 which engages the plate and the housing.

In the preferred embodiment, the device further includes a plurality of angularly spaced vertical rods 62 mounted on the piston shoulder plate 16, which pass up through openings 64 in the intermediate plate 52, through openings 66 in the top wall of the housing and terminate in pistons 68. Each piston 68 is slidably received in a close fitting, vertical, cylinder 70 mounted upon the outside of the housing top wall. These pistons 68 are designed to have little frictional drag on the cylinder 70 walls as these pistons move upwardly, but to frictionally engage the cylinder walls when moving downwardly. Thus, they act as checks to retard spring reaction after firing to keep the main piston 12 from hammering down upon the housing.

When the device 10 is to be used, it is mounted on a vehicle and pressed against the ground, which the cylinder plate 30 engages. As shown, the plate 14 mounts one or more spark plugs 80, which are threadedly mounted within apertures 82. The spark plugs are annularly spaced relative to one another and are all connected, as diagrammatically shown in the FIGURE, through a common lead wire 84 and switch 86 to a suitable source of electrical energy 88, such as a battery.

Chamber 90 is provided with an intake-exhaust valve 92 mounted within the hollow cylindrical manifold 22 and actuated by a solenoid 94 centrally mounted on the upper end plate 96 of the manifold. The valve comprises a frusto-conical head 98, which cooperates with a complementary aperture or valve seat 100 centrally located in the plate 16, and a stem 102 which forms the core of the solenoid 94. The stem 102 is slidably mounted in an aperture 104 located in end plate 96 and guide ring elements 106, 108 which are secured by spokes 110 to interior surface of the manifold sidewall. A helical coil spring 112 and a retaining ring 114 are mounted on the valve stem with the spring extending between the head 98 of the valve and the lower guide element 106, while the retaining ring 114 is mounted intermediate end plate 96 and the upper guide element 108.

As diagrammatically shown in the FIGURE, solenoid 94 is connected to the power source 88 through lead wire 116 and switch 118. When the switch 118 is opened, coil spring 112 unseats valve 92 and causes the valve to be extended until the retaining ring 114 engages guide element 108. When the switch 118 is closed, the solenoid 94 is energized and the valve is retracted until the head is seated in aperture of valve seat 100.

The intake and exhaust manifold 22 is also provided with an intake or fuel port 120 and an exhaust port 122 located in the end plate 96. Intake port 120 is connected to a pressurized supply of fuel (not shown) by fuel line 124 and is provided with a spring-biased one-way ball check valve 126, which normally seals fuel line 124 with respect to the manifold and prevents any exhaust gases from entering the line when the combustion chamber is purged. However, when it is desired to charge the combustion chamber, valve 126 is easily opened by the pressurized fuel which is admitted to the fuel line. Exhaust port 122 communicates through an exhaust line 128 with a two-way solenoid actuated valve 130. The solenoid valve 130 is connected through lead wire 132 and switch 134 to a source of electrical energy and is controlled in such a manner that the valve is closed when the combustion chamber is being charged and opened when the combustion chamber is being purged of the exhaust gases.

The windings of the electromagnet 32 are preferably enclosed by suitable covers 136, are insulated and, as shown diagrammatically in the FIGURE, are energized by power source 88 which is connected to the coils through suitable electrical conductors or lead wires 138 and a switch 140.

Switches 86, 118, 134, 140 and thus the energization of the spark plugs, solenoids and coils, are controlled by and contained within a suitable electrical timing distributor means 142 well known in the art, with housing 36 providing a ground for the electrical system. Of course, it is to be understood that other conventional means, not shown, are provided in the ignition system for the spark plugs to facilitate proper sparking. Thus, the ignition of the fuel within the chamber along with the energization of the solenoids, and coils are all coordinated so as to ensure proper operation of the apparatus.

In the operation of the embodiment of FIG. 1, the apparatus 10 is located on the ground 42 with plate 30, e.g., the bottom of the cylinder in contact with the ground. At the start of the cycle for maximum chamber pressure, solenoid exhaust valve 130 is closed, solenoid 94 is de-energized allowing valve 92 to open, coil windings 32 are energized and a valve, not shown, is opened, which permits pressurized fuel such as propane and oxygen or air to enter intake line or fuel line 124. The pressurized fuel opens and by-pass check valve 126 and flows through manifold 22 into combustion chamber 90. After the combustion chamber has been charged to a predetermined pressure of fuel, the valve connecting the intake line 124 with the source of pressurized fuel is turned off and solenoid 94 is energized retracting valve 92 until it is seated.

When the fuel has been introduced to the desired pressure, coil 32 is de-energized and the spark plugs 80 are energized igniting the fuel mixture within the combustion chamber. The resultant shock wave is transmitted through plate 30 to the earth, creating the desired seismic impulse. The reflection of the seismic impulse from the different strata in the earth is then detected by geophone receivers and properly recorded.

After the ignition takes place, the solenoid exhaust valve 130 is opened, and solenoid 94 is de-energized permitting valve 92 to open. The weight of housing 14 and the introduction of fresh air then forces the exhaust gases out through manifold 18 and exhaust valve 130 purging the combustion chamber and readying the apparatus for the next cycle.

It should be noted that several forces add to prevent easy upward movement of the piston 12; these and their approximate force contributions are:
a. The weight of the piston itself: Approx. 4 tons
b. Compression of the springs 56: Approx. 4 tons
c. The weight of the plate 52 (which may weigh e.g. 1,000—2,000 pounds): Approx. 1 ton
d. Compression of the springs 60: Approx. 4 tons
e. The downward force applied on the housing 36 by the vehicle as explained above: Approx. 8 tons In brief, when an explosion occurs within the chamber 90, the piston 12 moves upwardly but is restrained by the above-enumerated forces. Thus, the impact of the explosion is transferred in greater measure to the ground so that sensitive geophones can record reflections from the earth's crust. Creating a stronger shock wave is accomplished by having the gas under greater pressure at fire time. The shock wave is transmitted into the earth via the coupling of the housing which is resting upon the earth. There may be instances where the restraint which can be provided by the electromagnet 32 is not needed, in which case it may be turned off; otherwise suitable adjustments may be made to the amount of electrical energy supplied to the electromagnet, as must now be apparent.

In the embodiment shown, the volume of the chamber 90 may be varied by adding or removing one or more plates 150 to or from the piston 12 head.

Several, e.g., four, of the piston and cylinder arrangements 12, 14 may be mounted in a common housing and have a common plate 30 if the explosive force needed is greater than one piston and cylinder arrangement can withstand.

To summarize the sequence of events in the apparatus: (for maximum chamber pressure) energize electromagnets; fill firing chamber to desired pressure with combustible gas; close intake and exhaust valves; de-energize the electromagnets at the same time the electrodes are fired or a few milliseconds before to allow the the magnetic field to decay.

It should now be apparent that the seismic pulse generating apparatus as described hereinabove possesses each of the attributes set forth in the specification under the heading "Summary of the Invention" hereinbefore. Because the seismic pulse generating apparatus of the invention can be modified to some extent without departing from the principles of the invention as they have been outlined and explained in this specification, the present invention should be understood as encompassing all such modifications as are within the spirit and scope of the following claims.

What is claimed is:

1. Seismic pulse generating apparatus comprising:
a vertical cylinder member adapted to have a lower end portion thereof disposed against the ground;
a piston responsive to magnetic attraction force, slidably received in the cylinder through the upper end thereof;
magnetic coil means disposed about the cylinder member and constructed to, upon activation, tend to prevent upward movement of the piston, means for activating said magnetic coil means;
cooperating engaging shoulder means on said piston and said cylinder member for supporting the piston on the cylinder and, by preventing further incursion of the piston in the cylinder, defining a combustion chamber within the cylinder member, below the piston;
means for charging the combustion chamber with a fuel mixture;
means for igniting said fuel mixture to thereby generate a seismic pulse for transmission through the cylinder member to the ground; and
housing means for supporting the cylinder member from a heavy land vehicle, the housing means including arms adapted to be pressed downwardly by application of force from the weight of the vehicle to enhance the magnitude of the seismic pulse transferred to the ground from explosion of said fuel mixture within said combustion chamber;

a horizontal heavy plate mounted within said housing and bearing downwardly upon said piston;

a plurality of vertical rods extending between and secured to said housing and said cylinder member; said heavy plate having opening means therethrough freely receiving said rods;

two sets of coil springs mounted on said rods, one set engaging between said piston and said heavy plate and the other set engaging between the heavy plate and the housing;

a plurality of vertical rods having lower ends mounted on said piston and each having a piston mounted on the upper end thereof; a plurality of tubular cylinders mounted on said housing, each last-mentioned piston being frictionally slidably received in a respective one of said tubular cylinders for retarding downward movement of the first-mentioned piston after explosion of the fuel mixture within the combustion chamber has lifted said first-mentioned piston, and said heavy plate and has compressed said coil springs; and at least one plate removably secured to said piston within the cylinder member for regulating the volume of said combustion chamber.

* * * * *